United States Patent [19]

Sakai et al.

[11] Patent Number: 5,518,530

[45] Date of Patent: May 21, 1996

[54] CONNECTED BODY COMPRISING A GAS SEPARATOR AND A METAL, AND APPARATUS FOR SEPARATING HYDROGEN GAS FROM A MIXED GAS

[75] Inventors: Osamu Sakai, Nagoya; Tomonori Takahashi, Chita; Tetsuhisa Abe, Kuwana; Tomoyuki Fujii, Nagoya, all of Japan

[73] Assignee: NGK Insulators, Ltd., Nagoya, Japan

[21] Appl. No.: 321,894

[22] Filed: Oct. 14, 1994

[30] Foreign Application Priority Data

Oct. 18, 1993 [JP] Japan .................................. 5-259604
Mar. 28, 1994 [JP] Japan .................................. 6-057268

[51] Int. Cl.$^6$ .......................... B01D 53/22; B01D 71/02
[52] U.S. Cl. ............................... 96/11; 95/56; 55/524
[58] Field of Search ...................... 65/59.1, 59.35, 65/59.6; 95/55, 56; 96/4, 8, 10, 11; 55/524

[56] References Cited

U.S. PATENT DOCUMENTS

| | | | |
|---|---|---|---|
| 3,208,198 | 9/1965 | Rubin | 95/56 |
| 3,240,661 | 3/1966 | Babcock | 65/59.1 X |
| 3,312,043 | 4/1967 | Sexton | 96/10 |
| 3,468,781 | 9/1969 | Lucero | 95/56 X |
| 3,545,950 | 12/1970 | Earl | 65/59.35 |
| 3,920,172 | 11/1975 | Rhee | 65/59.1 X |
| 4,149,910 | 4/1979 | Popplewell | 65/59.1 X |
| 4,445,920 | 5/1984 | Smith | 65/59.6 X |
| 4,902,307 | 2/1990 | Gavalas et al. | 96/10 X |
| 4,971,696 | 11/1990 | Abe et al. | 96/11 X |
| 5,205,841 | 4/1993 | Vaiman | 95/56 X |
| 5,227,250 | 7/1993 | Bobal et al. | 65/59.1 X |
| 5,376,167 | 12/1994 | Broutin et al. | 96/10 X |

FOREIGN PATENT DOCUMENTS

| | | | |
|---|---|---|---|
| 0655632 | 1/1963 | Canada | 96/8 |
| 0080804 | 3/1971 | Germany | 65/59.1 |
| 61-077602 | 4/1986 | Japan | 96/8 |
| 61-157327 | 7/1986 | Japan | 96/10 |
| 61-185311 | 8/1986 | Japan | 96/8 |
| 62-143801 | 6/1987 | Japan | 95/56 |
| 62-273030A | 11/1987 | Japan . | |
| 63-171617A | 7/1988 | Japan . | |
| 63-224714 | 9/1988 | Japan | 96/8 |
| 63-295402A | 12/1988 | Japan . | |
| 3-146122A | 6/1991 | Japan . | |
| 5-73449 | 3/1993 | Japan . | |
| 0785256 | 12/1980 | U.S.S.R. | 65/59.1 |

OTHER PUBLICATIONS

Shigeyuki Uemiya et al., *Journal of Membrane Science*, 56 (1991), pp. 315–325, "Hydrogen permeable palladium–silver alloy membrane supported on porous ceramics".

*Primary Examiner*—Robert Spitzer
*Attorney, Agent, or Firm*—Ronald J. Kubovcik

[57] ABSTRACT

A connected body including a gas separator 10 and metallic members 21 and 22, each of which has a partly oxidized surface to be reliably connected with the gas separator. The gas separator includes a ceramic substrate 11 and a gas separation membrane 12 to be coated onto substrate 11. The substrate 11 is porous so that a gas molecule can pass therethrough, and gas separation membrane 12 is connected with metallic members 21 and 22 by a glass 15 having a thermal expansion coefficient of $5.0$–$8.0 \times 10^{-6}/°C$. Glass 15 contacts with metal supporters 21 and 22 with a contact angle of 90° or less. The connected body of a gas separator and metallic supporters and an apparatus for separating hydrogen gas from a mixed gas display excellent durability and are free from leakage at the joints during the separation of hydrogen gas at high temperatures and under high pressure.

9 Claims, 3 Drawing Sheets

CONNECTED BODY COMPRISING A GAS SEPARATOR AND A METAL, AND APPARATUS FOR SEPARATING HYDROGEN GAS FROM A MIXED GAS

BACKGROUND OF THE INVENTION AND RELATED ART STATEMENT

The present invention relates to a connected body comprising a gas separator and a metal and to an apparatus for separating hydrogen gas selectively and effectively from a mixed gas to be treated.

Hydrogen gas is used in a great amount in the field of petrochemistry and is highly expected as a clean energy source. A natural gas, naphtha, or the like is first converted, by a catalyst, to a hydrogen-containing gas, from which hydrogen gas is then separated to give a hydrogen gas with high purity.

Only hydrogen gas dissolves in palladium and palladium alloy, thereby hydrogen gas can be selectively separated from a mixed gas. Japanese Patent Application Laid-Open 273030/1987 and Japanese Patent Application Laid-Open 171617/1988 each disclose a gas separator which is produced by covering the surface of a porous substrate with a gas separation membrane consisting of palladium or a palladium alloy. The porous substrate is made of porous glass or a ceramic such as aluminum oxide. Since a palladium membrane itself does not possess sufficient mechanical strength, the palladium membrane is coated onto a substrate. Hydrogen gas is effectively separated from a mixed gas, using a gas separation membrane, by accelerating a speed of the gas diffusion in the gas separation membrane. Therefore, hydrogen gas is preferably separated from a mixed gas under a high pressure in the range of 5–10 atm. at a high temperature of 300° C. or higher, more preferably 500° C. or higher. In this step, the important points are airtightness and durability of joints between the gas separator and its supporters. That is, the joints are required to have durability and no leakage of the mixed gas or the separated gas.

An apparatus for separating hydrogen gas from a mixed gas has a structure that a gas containing hydrogen gas is introduced from one side of the gas separator and that only hydrogen gas can penetrate the gas separator so as to give refined hydrogen gas from the other side of the gas separator. Therefore, a mixed gas to be treated on one side has to be airtightly separated from the refined hydrogen gas on the other side in the apparatus, and it is important that a gas to be treated does not leak out to the side for the refined hydrogen gas from the joints between the gas separators and the supporters.

There is a conventional apparatus for separating hydrogen gas from a mixed gas. In the apparatus, a gas separator is connected with the supporters by means of O-rings. However, the apparatus can be used only at 200° C. or lower, and it is not easy for the apparatus to maintain the airtightness at a temperature higher than 200° C. A joint which can be used at 500° C. or higher has not been developed.

When a gas separation membrane is formed by chemical metal-plating on the surface of a gas separator and of a joint where the gas separator is connected with the supporter by means of a glass, the glass does not adhere sufficiently to the gas separation membrane. The gas separation membrane sometimes exfoliates from the joint where a glass is used, causing the leakage of a mixed gas into a refined gas.

A gas separator has a tubular ceramic substrate and a gas separation membrane on the outer surface of the substrate. A metallic supporter has at least one hole through which or into which the gas separator is inserted. When a gas separator is connected with a metallic supporter by means of wax, the gap between the surface of the gas separation membrane and the hole of the supporter is required to be 100 μm or less. However, it is difficult to produce a tubular gas separator having such a precise and accurate diameter.

Hence, the present invention aims to provide a connected body having a gas separator and a metal and an apparatus for separating hydrogen gas from a mixed gas. In the connected body, the joint between a gas separator and a metal is airtight and the mixed gas does not leak in the refined hydrogen gas even if the hydrogen gas is separated from the mixed gas at 200° C. or higher.

SUMMARY OF THE INVENTION

According to the present invention, there is provided a connected body comprising: a gas separator having a ceramic substrate and a gas separation membrane coated onto the substrate, the substrate being porous so that a gas molecule can pass therethrough; and a metallic member having a surface which is partly oxidized to be connected with the gas separator; wherein the gas separation membrane is connected with the metallic member by means of a glass having a thermal expansion coefficient of $5.0–8.0 \times 10^{-6}/C.°$, and the glass contacts with the metallic member with a contact angle of 90° or less.

Preferably, a gas separation membrane is formed of a metal containing palladium.

According to the present invention, there is further provided an apparatus for separating hydrogen gas from a mixed gas, comprising: a chamber (container); a gas separator equipped in the chamber, the gas separator having a ceramic substrate and a gas separation membrane which is coated onto the substrate, the substrate being porous so that a gas molecule can pass therethrough; and a supporter supporting the gas separator; wherein the gas separation membrane allows only hydrogen gas to pass therethrough selectively, and the gas separator is connected with the supporter by means of a glass.

Preferably, at least the gas separation membrane of the gas separator contacts with the glass, by which the gas separator connects with the supporter. More preferably, the gas separation membrane and the supporter contact with the glass, and thereby the gas separator is connected with the supporter.

The supporter may be formed of metal, and a surface of the metallic supporter is partly oxidized so as to reliably contact with the glass, and the gas separator may be connected with the metallic supporter by means of a glass which has a thermal expansion coefficient of $5.0–8.0 \times 10^{-6}/°C.$ and which contacts with the metallic supporter with a contact angle of 0°–90°.

The gas separation membrane is preferably formed of a metal containing palladium, and the glass contacts with the metal with a contact angle of 0°–90°, more preferably 15°–45°, so as to enhance the binding strength between a gas separation membrane and glass.

DETAILED DESCRIPTION OF THE INVENTION

The present inventors studied the structure in which a gas separator formed by coating a metal having a gas-separating ability onto a porous ceramic tube penetrates a supporter, is adhesively fixed to the supporter, and is supported by the supporter.

As a result, the present inventor found out that the aforementioned problem can be solved by connecting a gas separator with supporters by means of a glass having appropriate properties.

First, properties of a glass suitable for a connected body of the present invention are hereinbelow described.

Thermal expansion coefficient is a value showing the rate of expansion ratio to temperature change when an object is thermally expanded under a certain pressure. The thermal expansion coefficient in the present invention means a linear thermal expansion coefficient showing an expansion ratio of the length of a solid under atmospheric pressure.

The thermal expansion coefficient of a glass is measured at a temperature lower than the transition point of glass. The elongation of glass by thermal expansion increases almost linearly in proportion to the temperature. However, the elongation by thermal expansion increases at a temperature higher than the transition point in comparison with the elongation at a temperature lower than the transition point, and therefore, the gradient becomes larger when plotted.

It is difficult to clearly find a transition point of a glass on a thermal expansion curve. However, a transition point of a glass was found in the present invention by the following method. Two tangential lines to a thermal expansion curve were drawn (One is in a low temperature range, and the other is in a high temperature range.). The angle at the point of intersection formed by two tangential lines was bisected, and the point where the bisector crosses the thermal expansion curve was determined as a transition point of a glass. Note that the transition point of a glass is lower than the melting point of the glass.

Figure 1:
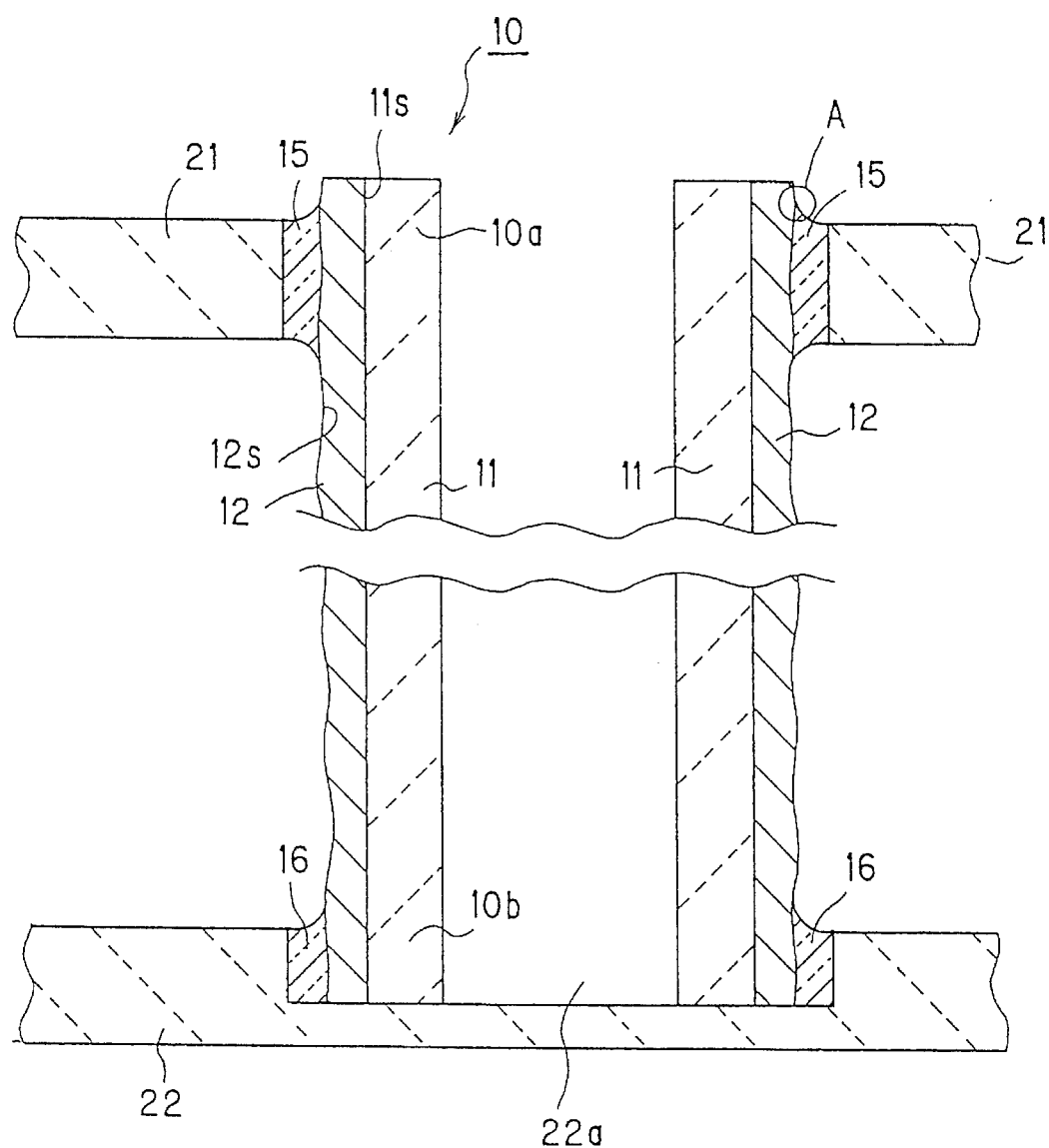
FIG. 1 is a cross-sectional explanatory view showing the joints between a gas separator and supporters inside an apparatus for separating hydrogen gas of the present invention.

In the present invention, a glass is employed to connect a gas separator with supporters. FIG. 1 shows a cross-sectional view of an embodiment of connecting a gas separator and a supporter. A gas separator 10 has a tubular substrate 11 and a gas separation membrane 12 coated onto the outer surface 11s of the substrate. The gas separator 10 is placed, for example, perpendicularly.

One end 10a of gas separator 10 passes through a supporter 21, and the inner space of the gas separator 10 is connected with the upper space over the supporter 21. The diameter of the throughhole in the supporter is slightly larger than the outer diameter of the gas separator. The end 10a of the gas separator 10 is supported by the supporter 21 by means of the glass 15 filling a gap between a gas separation membrane 12 and supporter 21. At this time, the surface 12s of the gas separation membrane 12 contacts with the glass 15, and the glass 15 contacts with the supporter 21. Thus, the gas separator 10 is connected with the supporter 21.

The throughhole of the gas separator 10 is sealed at the other end by a depression 22a in a supporter 22 and is supported by the supporter 22. The end 10b is connected with the supporter 22 by filling the gap between the gas separation membrane 12 and the supporter 22 with glass 16. More than one gas separator 10 may be supported by the supporters 21 and 22. Note, the supporters 21 and 22 are fixed in an apparatus for separating hydrogen gas.

Preferably, the material of the supporters is the same as that of the substrate. However, the substrate is porous, and therefore, a gas molecule can penetrate into the substrate. On the other hand, the supporters are so tight that a gas molecule cannot pass through. The supporters may be metallic.

A mixed gas to be treated is introduced into the space between the supporter 21 and the supporter 22. Only hydrogen gas penetrates the gas separation membrane 12 and the porous substrate 11 and is introduced into the space inside the substrate 11 to give a refined hydrogen gas. The remainder of the mixed gas does not penetrate the gas separator and is exhausted from an unillustrated outlet.

In the present invention, a thermal expansion coefficient of the glass may be 50–100%, preferably 60–90% of the smaller thermal expansion coefficient between that of the substrate and that of the supporters. When the thermal expansion coefficient of the glass is higher than 100%, a descent of the temperature after the connection of the glass at a glass-melt temperature generates tensile strength inside the glass joints, which may cause cracks in the glass. A mixed gas to be treated leaks into the refined gas from the cracks at joints, lowering the purity of the hydrogen gas. When the thermal expansion of the glass is lower than 50%, a gap is generated between the gas separator and the supporters within the temperature range of refining a mixed gas, causing a leak of the unrefined gas into the refined gas.

When a metal is used as the supporters, a glass having a thermal coefficient of $5.0–8.0\times10^{-6}/°C$. is preferably employed.

When an apparatus for separating hydrogen gas from a mixed gas is industrially used, the apparatus is sometimes exposed at room temperature and at a refining temperature alternately, or the apparatus is sometimes used at a refining temperature for a long period of time. The joint should be free from leaks of the unrefined gas on such occasions, and a glass having a thermal coefficient within the aforementioned range prevents the unrefined gas from leakage.

Figure 2:
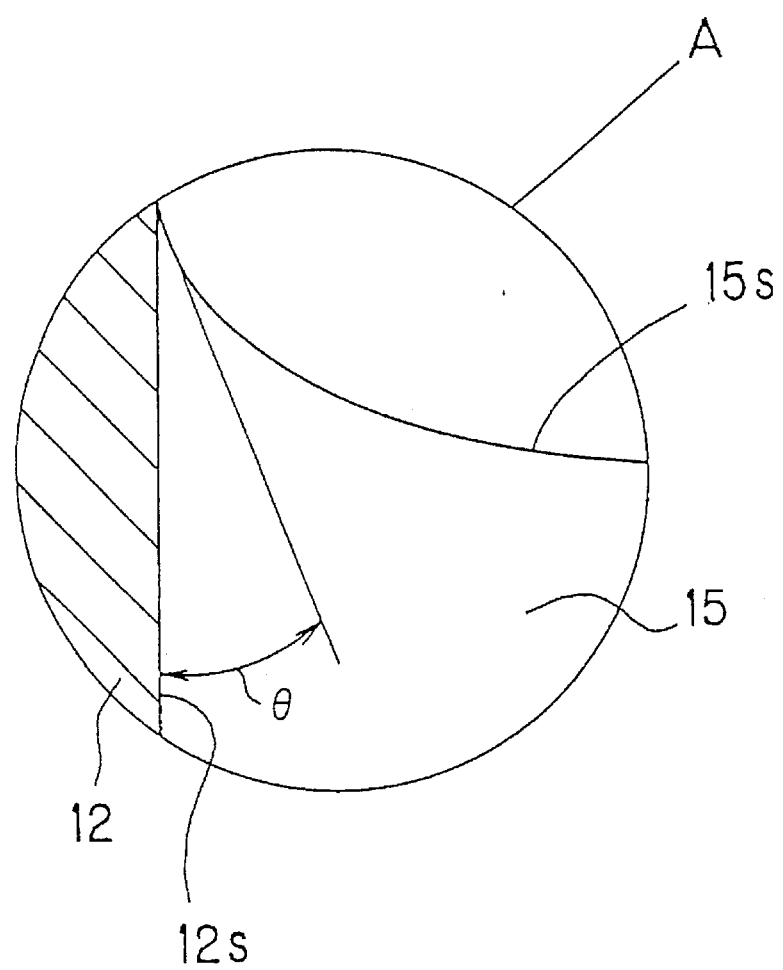
FIG. 2 is a magnified view of part A of FIG. 1.

A gas separation membrane may be made of a metal containing palladium. "Metals containing palladium" include a simple substance of palladium and palladium alloys. The contact angle of the glass to the metal forming a gas separation membrane is preferably within the range of 0°–90°, more preferably, 15°–45°. In FIG. 2, a contact angle θ is determined by the glass surface 15s and the metal surface 12s. The contact angle depends on the temperature and the atmosphere when the glass is connected with the metal. The value of the contact angle θ is found by cutting and observing the joint of the gas separation membrane 12 made of a metal and the glass 15.

A contact angle within the aforementioned range improves the wettability of the gas separation membrane and the glass. When the contact angle is larger than 90°, the glass does not adhere to the metal sufficiently, and it sometimes causes exfoliation between the glass and the gas separation membrane. On the other hand, when the contact angle is too small, the glass sometimes flows out of the gap between the gas separation membrane and the supporter, making the connection difficult.

Incidentally, since glass generally has high wettability with ceramic oxides, a connection of glass with a ceramic-oxide supporter seldom has a wettability problem. On the other hand, the contact angle of a glass with a metallic supporter is preferably within the aforementioned range.

The substrate of a gas separator supports the palladium membrane because the palladium membrane itself has low mechanical strength. The substrate has numerous fine pores, for example, three-dimensionally continuous pores so that a gas molecule can pass therethough. Each pore has a diameter of preferably 0.003–20 μm, more preferably 0.005–5 μm, and most preferably 0.01–1 μm. A pore having a diameter smaller than 0.003 μm makes the resistance larger when the hydrogen gas passes therethrough. A pore having a diameter larger than 20 μm is not preferable because the gas separation membrane is liable to have pin holes. A preferable porous substrate can be obtained, for example, by the method disclosed in Japanese Patent Application Laid-Open 273030/1987.

Preferably, materials which do not react with a mixed gas are suitable for the substrate. Specifically, there can be used a ceramic oxide such as β-alumina, aluminum oxide, silica, silica-alumina, mullite, cordierite, and zirconia, or a ceramic such as porous glass or carbon. The material for the substrate is not limited to a ceramic, and a porous metal which does not react with a mixed gas to be treated or with palladium can be used. For example, a substrate can be obtained by kneading a ceramic powder, forming the ceramic powder into a compact having the shape of a pipe or the like by extrusion molding, firing the compact, and making fine pores.

A gas separation membrane selectively allows hydrogen gas to pass therethrough. The material forming a gas separation membrane is, for example, a metal containing palladium. Such a palladium alloy preferably contains metal(s) except for palladium in an amount of 10–30% by weight as described in Journal of Membrane Science, 56(1991)315–325: "Hydrogen Permeable Palladium—Silver Alloy Membrane Supported on Porous Ceramics" and in Japanese Patent Application Laid-Open 295402/1988. The object of alloying palladium is to prevent palladium from brittleness caused by hydrogen gas and to improve the efficiency of separation at high temperatures. Palladium is preferably alloyed with silver to prevent palladium from brittleness.

As described in Japanese Patent Application Laid-Open 146122/1991, a membrane containing palladium and silver distributed relatively uniformly in the direction of thickness can be used. Japanese Patent Application Laid-Open 146122/1991 discloses a method for producing a gas separator. In the method, a palladium membrane is formed on the surface of a heat-resistant porous substrate by chemical plating, a silver membrane is formed on the palladium membrane, and the substrate with the palladium membrane and the silver membrane is thermally treated. In this method, palladium and silver are uniformly distributed in the palladium alloy membrane by the thermal treatment.

When a metal is used as a supporter, SUS, Inconel, Kovar or the like can be preferably used. An oxidized membrane is preferably formed on the surface to enhance wettability between the supporter and a glass. However, when the surface is over oxidized, airtightness in the oxidized membrane deteriorates. Therefore, it is required that an adequate oxidizing condition is selected.

A gas separation membrane preferably has a thickness of 50 μm or less, more preferably 20 μm or less. When the membrane is thicker than 50 μm, the time for diffusion of hydrogen gas is unpreferably elongated. When the substrate has a tubular shape, a gas separation membrane may be formed on any of the inner surface, the outer surface, or both surfaces of the substrate.

Japanese Patent Application 73449/1993 discloses, by the present inventor, a gas separator in which the pores on the surface of the substrate are filled with a gas separation membrane made of a palladium alloy. The gas separator is liable to deteriorate the purity of the refined hydrogen gas because the remaining gas leaks into the refined hydrogen gas through pores passing through the gas separation membrane.

As a method for coating a gas separation membrane on the substrate, a conventional method such as chemical plating, vapor deposition, or sputtering can be employed.

Figure 3:
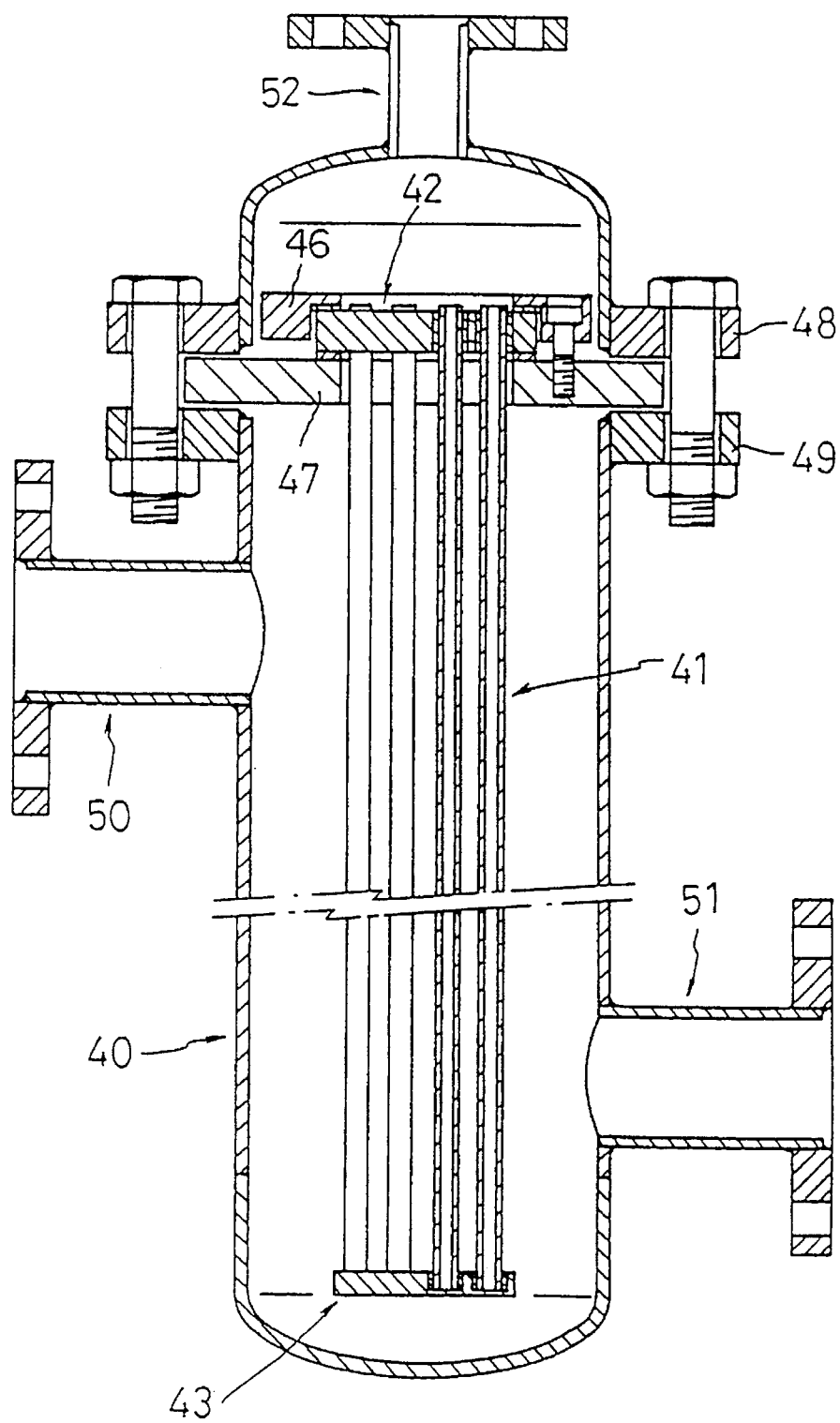
FIG. 3 is a cross-sectional explanatory view of an embodiment of an apparatus for separating hydrogen gas.

FIG. 3 shows a cross-sectional view of an embodiment of an apparatus for separating hydrogen gas. A plurality of hydrogen gas separators 41 are installed in a high-pressure resistant container 40. Each of the separators 41 is supported by a flange 42 by means of a throughhole (not shown) which has a slightly larger diameter than the outer diameter of the gas separator 41 so that the inner space of the gas separator 41 connects with the space over the flange 42. Each of the separators 41 is also supported by a flange 43, which has holes (not shown) to seal one end of each of the separators 41. The separators 41 are connected with the flanges 42 and 43 by means of a glass. A gas separation membrane is coated onto the tubular substrate to form a hydrogen gas separator.

A supporting plate 47 is put between a flange 48 and a flange 49 and is fixed by the flanges 48 and 49. The flange 42 is fixed by the supporting plate 47 and a member 46. The hydrogen gas separators 41 with a flange 43 are hung from the flange 42. An unrefined gas is supplied to the high-pressure resistant container 40 through the first pipe 50. Only hydrogen gas penetrate into the tubular gas separators 41. The refined hydrogen gas is inducted into the third pipe 52, and the remainder of the mixed gas flows out through the second pipe 51.

The present invention is hereinbelow described in more detail with reference to the illustrated embodiments. However, the present invention is not limited to these embodiments.

EXAMPLE 1

First, a porous substrate was subjected to activating treatment. A porous α-alumina tube having an outer diameter of 10 mm, an inner diameter of 7 mm, a length of 300 mm, and a diameter of fine pores of 0.1 μm was immersed in an aqueous solution of 0.1% hydrochloric acid containing 0.1% by weight of $SnCl_2 \cdot 2H_2O$ for one minute. Then, the tube was immersed in an aqueous solution of 0.1% hydrochloric acid containing 0.01% by weight of $PdCl_2$ for one minute. The tube was immersed alternately ten times in each of the aqueous solutions.

Then, the tube was chemically plated with palladium. To 1 liter of deionized water were added 5.4 g of $[Pd(NH_3)_4]Cl_2 \cdot H_2O$, 67.2 g of 2Na·EDTA, 651.3 ml of aqueous ammonia having an ammonia concentration of 28%, and 0.46 ml of $H_2NNH_2 \cdot H_2O$ so as to obtain an aqueous solution. The porous alumina tube which was subjected to the aforementioned activating treatment was immersed in the aqueous solution having a temperature of 50° C. The period of time for the immersion was suitably varied, and the tube was chemically plated with silver so that the weight ratio of palladium to silver was 80:20.

Finally, the tube was heated at 900° C. for 12 hours to mutually diffuse palladium and silver so that palladium and silver are alloyed to give a gas separator.

In Examples 1–14, the supporter 21 shown in FIG. 1 has a shape of a ring, and the supporter 22 has a shape of a cap with depression 22a. Both the supporter 21 and the supporter 22 are made of α-alumina like the substrate. The thermal expansion coefficient of the substrate was $7.4\times10^{-6}/°C.$, and that of the supporters 21 and 22 was $7.3\times10^{-6}/°C$. The thermal expansion coefficient was measured at a temperature ranging from 40° C. to 400° C.

Independently, the gas separator with 8 Kg/cm² of argon gas in the space for unrefined gas was heated up to 600° C. from room temperature and then cooled down to room temperature. This cycle was repeated ten times. The apparatus was tested for durability by the heat-cycle test at temperatures at which the apparatus is used in practice. After the heat-cycle test, the apparatus was measured for the leakage of argon to test for airtightness again.

TABLE 1

| | | Glass | | | Ar leakage (cm³/min.) | | |
| --- | --- | --- | --- | --- | --- | --- | --- |
| | | Kind | Thermal expansion coefficient ($10^{-6}/°C.$) | Ratio | Contact angle (°) | Airtightness test | After heat Cycle | After durability test |
| Example | 1 | A | 3.5 | 48 | 15 | 2.40 | 3.88 | 3.72 |
| | 2 | B | 3.7 | 51 | 95 | 4.20 | 4.50 | 4.24 |
| | 3 | A | 4.2 | 58 | 15 | 0.18 | 0.21 | 0.22 |
| | 4 | B | 4.6 | 63 | 90 | 0.00 | 0.00 | 0.00 |
| | 5 | A | 5.1 | 70 | 45 | 0.00 | 0.00 | 0.00 |
| | 6 | B | 5.5 | 75 | 95 | 0.10 | 0.26 | 0.13 |
| | 7 | B | 5.7 | 78 | 90 | 0.00 | 0.00 | 0.00 |
| | 8 | C | 6.3 | 86 | 30 | 0.00 | 0.00 | 0.00 |
| | 9 | C | 6.9 | 95 | 50 | 0.02 | 0.04 | 0.02 |
| | 10 | C | 7.1 | 97 | 15 | 0.33 | 0.57 | 0.42 |
| | 11 | B | 7.3 | 100 | 100 | 0.63 | 0.95 | 0.84 |
| | 12 | C | 7.6 | 104 | 45 | 1.52 | 1.86 | 1.92 |
| | 13 | D | 7.7 | 105 | 15 | 2.58 | 3.26 | 3.75 |
| | 14 | D | 8.1 | 111 | 30 | 5.48 | 6.37 | 6.13 |

TABLE 2

| Glass | | Thermal expansion coefficient ($10^{-6}/°C.$) | Connecting Temperature (°C.) |
| --- | --- | --- | --- |
| A | $SiO_2$—$ZnO$—$B_2O_3$ type | 3.5–5.7 | 1050 |
| B | $SiO_2$—$Na_2O$—$BaO$ type | 3.5–8.3 | 700 |
| C | $SiO_2$—$Al_2O_3$—$CaO$ type | 6.9–7.7 | 1300 |
| D | $SiO_2$—$PbO$—$B_2O_3$ type | 4.5–8.8 | 1000 |

In Table 1, the ratio in each example was obtained as follows:
(Thermal expansion coefficient of glass)/(Thermal expansion coefficient of substrate)×100.
The glass used in Example 1 corresponds to the Glass A shown in Table 2.

In Example 1, a glass having the thermal coefficient shown in Table 1 was used for connecting a gas separator with a supporter at a temperature of 1050° C. under Ar atmosphere for 30 minutes. Then, the gas separator connected with the supporter was cooled down at a speed of 50° C./h or slower so as to prevent distortion, which is caused by quick quenching.

The gas separator connected with the supporter was tested for airtightness. The gas separator connected with the supporter was cut so as to observe the connecting condition. As a result, it was found that the glass possesses excellent wettability to the alumina flange and the palladium alloy membrane. The contact angle of the glass to the palladium membrane was shown in Table 1.

The supporter connected to the gas separator was fixed to the container so as to obtain an apparatus for separating hydrogen gas. The apparatus was tested for airtightness. Then, 8 Kg/cm² of argon gas was inducted into the space for unrefined gas. The amount of argon gas which leaked into the space for refined gas was measured.

Additionally, the apparatus was maintained at 600° C. for 100 hours to test for durability, and then measured for the leakage of argon to test for airtightness. These results including the test for airtightness, the test for gas separation, and the heat cycle test are shown in Table 1.

EXAMPLES 2–14

In each Example, a gas separator the same as in Example 1 was produced. Therefore, a palladium alloy was formed on the same alumina tube under the same condition as in Example 1. The gas separator was connected with the same supporters 21 and 22 as in Example 1. The glass used for the connection and the connecting temperature are shown in Tables 1 and 2. The gas separator was connected with the supporters under an Ar atmosphere for 30 minutes, and then cooled down to room temperature at a speed of 50° C./h or slower to prevent distortion, which is caused by quick quenching.

The gas separator connected with the supporters was tested for airtightness. The test was performed in the same manner as in Example 1. The joints between the gas separator and the supporters were measured for the contact angle by cutting the gas separator with the supporters so as to obtain a transverse cross section.

The gas separator with the supporters was tested for heat-cycle resistance and durability in the same manner as in Example 1. Then, the gas separator was tested for airtightness. These results are shown in Table 1.

EXAMPLES 15–21

In each example, an apparatus for separating hydrogen gas, which employed Kovar for the supporters 21 and 22, was produced. Each of the glasses having various thermal expansion coefficients and wettability values was tested for airtightness. Further, the relation between the thickness of the Pd-Ag membrane and airtightness was investigated in the same manner as in Examples 1–14.

The surface of Kovar was oxidized under the condition of 1000° C.×5 minutes. The supporters were connected with a glass under Ar atmosphere at 1070° C. for 20 minutes, and then cooled down at a speed of 50° C./h or slower to room temperature so as to prevent distortion, which is caused by quick quenching.

As a result, it was found that a glass for the connection preferably has a thermal expansion coefficient of 5.0–8.0× $10^{-6}$/°C. and a wettability of 90° C. or lower to Kovar. It was also found that a Pd-Ag membrane preferably has a thickness of 2–50 μm. These results are shown in Table 3.

TABLE 3

|  | Example | | | | | | |
| --- | --- | --- | --- | --- | --- | --- | --- |
|  | 15 | 16 | 17 | 18 | 19 | 20 | 21 |
| Properties of glass | | | | | | | |
| Thermal expansion coefficient (× $10^{-6}$) | 5.1 | 5.1 | 6.7 | 6.7 | 3.1 | 8.6 | 6.5 |
| Softening point (°C.) | 718 | 718 | 850 | 850 | 870 | 760 | 785 |
| Working point (°C.) | 1058 | 1058 | 1046 | 1046 | 1060 | 1015 | 1043 |
| Contact Angle with kovar (°) | 20 | 20 | 15 | 15 | 20 | 20 | 95 |
| Thickness of Pd—Ag membrane (μm) | 20 | 150 | 20 | 150 | 20 | 20 | 20 |
| Leakage of Ar (cm³/min.) | | | | | | | |
| After connection | 0.10 | 3.60 | 0.25 | 4.50 | 5.60 | 5.70 | 3.75 |
| After heat cycle | 0.35 | 4.85 | 0.35 | 4.60 | 7.80 | 8.45 | 4.50 |
| After durability test | 0.55 | 5.85 | 0.40 | 5.50 | 8.30 | 9.50 | 4.80 |

EXAMPLES 22–25

In each example, a hydrogen gas separator prepared in the aforementioned manner was connected with supporters made of Kovar oxidized under an oxidizing condition by means of a glass so as to obtain an apparatus for separating hydrogen gas which is shown in FIG. 3. Each apparatus was tested for airtightness in the same manner as in Examples 15–21. There were used a Pd-Ag membrane having a thickness of 20 μm and a glass having a thermal expansion coefficient of 6.7×$10^{-6}$/°C. and a softening point of 850° C. The connection by means of a glass was conducted in the same manner as in Examples 15–21. The aforementioned test indicates that too little oxidation of Kovar supporters deteriorates adhesivity to the glass and that too much oxidation of Kovar supporters deteriorates airtightness of the membrane. In any of these cases, the leakage of Ar-gas increases. The results are shown in Table 4.

TABLE 4

|  | Example | | | |
| --- | --- | --- | --- | --- |
|  | 22 | 23 | 24 | 25 |
| Conditions for oxidation | | | | |
| Temperature (°C.) | 1000 | 1000 | 700 | 500 |
| Time (min.) | 5 | 60 | 5 | 5 |
| Amount increased by oxidation (g/cm²) | 0.6 | 1.5 | 0.4 | 0.1 |
| Leakage of Ar | | | | |

TABLE 4-continued

|  | Example | | | |
| --- | --- | --- | --- | --- |
|  | 22 | 23 | 24 | 25 |
| (cm³/min.) | | | | |
| After connection | 0.10 | 4.30 | 0.20 | 5.50 |
| After heat cycle | 0.35 | 6.60 | 0.25 | 7.50 |
| After durability test | 0.55 | 7.35 | 0.35 | 7.80 |

As described above, both (1) a connected body of a gas separator and a metal and (2) an apparatus for separating hydrogen gas from a mixed gas of the present invention can be used at a high temperature under high pressure without any leakage of gas at joints between the gas separator and the metallic member, and both the connected body and the apparatus are excellent in durability.

What is claimed is:

1. A connected body comprising:
    a gas separator comprising a ceramic substrate and a gas separation membrane coated onto said substrate, said substrate being porous so that a gas molecule can pass therethrough; and
    a metallic member having a partly oxidized surface connected with said gas separator;
    wherein said gas separation membrane is connected with said metallic member by means of a glass having a thermal expansion coefficient of 5.0–8.0×$10^{-6}$/°C.; and
    said glass contacts with said metallic member with a contact angle of 90° or less.

2. A connected body according to claim 1, wherein said gas separation membrane is formed of a metal containing palladium.

3. An apparatus for separating hydrogen gas from a mixed gas comprising:
    a chamber;
    a gas separator disposed in said chamber, said separator comprising a ceramic substrate and a gas separation membrane coated onto said substrate, said substrate being porous so that a gas molecule can pass therethrough; and
    a supporter supporting said gas separator;
    wherein said gas separating membrane allows only hydrogen gas to pass therethrough selectively; and said gas separator is connected with said supporter by means of a glass.

4. An apparatus for separating hydrogen gas from a mixed gas according to claim 3, wherein at least said gas separation membrane of said gas separator contacts with said glass, and thereby said gas separator is connected with said supporter.

5. An apparatus for separating hydrogen gas from a mixed gas according to claim 4, wherein said glass has a thermal expansion coefficient that is 50% to 100% of a thermal expansion coefficient of said substrate and said supporter.

6. An apparatus for separating hydrogen gas from a mixed gas according to claim 5, wherein said glass has a thermal expansion coefficient that is 60% to 90% of a thermal expansion coefficient of said substrate and said supporter.

7. An apparatus for separating hydrogen gas from a mixed gas according to claim 3, wherein said supporter is a metallic supporter, a surface of said metallic supporter is partly oxidized so as to reliably contact with said glass, and said glass connecting said gas separator with said metallic supporter has a thermal expansion coefficient of $5.0–8.0 \times 10^{-6}$/°C. and contacts with said metallic supporter with a contact angle of $0°–90°$.

8. An apparatus for separating hydrogen gas from a mixed gas according to claim 3, wherein said gas separation membrane is formed of a metal containing palladium, and said glass contacts with said metal with a contact angle of $0°–90°$.

9. An apparatus for separating hydrogen gas from a mixed gas according to claim 3, wherein said supporter is formed of said ceramic of which said substrate is formed.

* * * * *